United States Patent

Hurko et al.

[15] 3,674,983
[45] July 4, 1972

[54] SMOOTH SURFACE ELECTRIC COOKTOP

[72] Inventors: Bohdan Hurko; Raymond L. Dills, both of Louisville, Ky.
[73] Assignee: General Electric Company
[22] Filed: April 8, 1971
[21] Appl. No.: 132,348

[52] U.S. Cl. ..........................219/462, 219/436, 219/461, 219/464, 219/467
[51] Int. Cl. .........................................................H05b 3/68
[58] Field of Search ..............................219/464, 458–463, 219/465–468, 436, 438, 443

[56] References Cited

UNITED STATES PATENTS

| | | | |
|---|---|---|---|
| 3,406,278 | 10/1968 | Bassett, Jr. et al. | 219/464 X |
| 3,083,286 | 3/1963 | Swetlitz | 219/464 |
| 1,954,128 | 4/1934 | Heyroth et al. | 219/461 |
| 2,570,975 | 10/1951 | Osterheld | 219/462 X |
| 2,691,717 | 10/1954 | Huck | 219/462 |
| 2,923,803 | 2/1960 | Kueser | 219/436 X |
| 2,978,564 | 4/1961 | Blanding et al. | 219/465 X |
| 3,028,476 | 4/1962 | Jug | 219/443 |
| 3,445,630 | 5/1969 | Ulam | 219/438 |
| 3,489,880 | 1/1970 | Bloomfield et al. | 219/436 |
| 3,569,672 | 3/1971 | Hurko | 219/464 |

FOREIGN PATENTS OR APPLICATIONS

| | | | |
|---|---|---|---|
| 585,955 | 10/1933 | Germany | 219/438 |
| 277,625 | 9/1914 | Germany | 219/438 |
| 379,232 | 8/1923 | Germany | 219/438 |

*Primary Examiner*—Volodymyr Y. Mayewsky
*Attorney*—Richard L. Caslin and Francis H. Boos, Jr.

[57] ABSTRACT

A smooth surface cooktop having a large glass-ceramic plate means with individual heated areas where each area is supplied with a combined aluminum plate and an electric heating element therebeneath. A deep drawn reflector pan underlies the aluminum plate and supports the peripheral edge thereof. The top edge of the reflector pan is extended outwardly to underlie the expanse of the glass-ceramic plate surrounding the heated area. A metal compression spring is seated in the reflector pan to bear against the underside of the aluminum plate to ensure good thermal coupling between the heated aluminum plate and the glass-ceramic plate. Adjustable hold-down means secure each heating element in a rough-in mounting box.

11 Claims, 3 Drawing Figures

INVENTORS
BOHDAN HURKO
& RAYMOND L. DILLS
BY *Richard L. Caslin*
THEIR ATTORNEY 3,674,983

SMOOTH SURFACE ELECTRIC COOKTOP

BACKGROUND OF THE INVENTION

A standard electric cooktop is usually provided with a plurality of metal sheathed electrical resistance heating elements which are each wound in the form of a spiral coil and positioned in an opening formed in the cooktop. Each heating element is adapted to support a cooking utensil thereon. These metal sheathed heating elements are cleaned automatically of food soil due to the high temperatures they are allowed to reach once they are energized, but is possible for spillovers to drain through the heating element and accumulate in a collecting pan located beneath the cooktop from which they must be cleaned by hand.

In order to simplify this cleaning problem, entire cooktops, or in some cases, individual solid plate surface units have been offered in which the exposed surface is formed of a glass-ceramic or crystalline glass plate. Examples of such material are the types of glass sold under such trademarks as "PYROCERAM," "CER-VIT," and "HERCUVIT." The opaque crystalline glass, because of its smooth top surface of almost ground glass appearance, not only presents a pleasing appearance, but it is also readily cleanable and it does not permit the drainage of spillovers therebeneath.

One problem that must be faced is that of obtaining satisfactory fast heating rates and fast cooling rates as compared with those available from a standard metal sheathed electric resistance heating element, or a gas surface burner. One handicap encountered is the rather poor quality of thermal conductivity through the glass-ceramic material. Such a material is used widely as a thermal and electrical insulating material rather than as in the present case as a thermal conductor. Heat does not readily defuse laterally through the glass plate, and during a cooking operation heat will flow to the utensil only through the points of contact between the heating element and a heat spreader plate of aluminum or the like material that is attached to the heating element and is designed to be in thermal conducting relationship with the glass-ceramic plate. Moreover, the glass-ceramic plate has a rather large heat capacity, such that when the power is cut off to the heating element it takes a relatively long time to cool the glass-ceramic plate down to room temperature.

The principle object of the present invention is to provide a smooth surface cooktop with a combined aluminum plate and heating element as the heat source and reinforcing means for supporting the aluminum plate to ensure good thermal coupling between the aluminum plate and the glass-ceramic plate.

A further object of the present invention is to provide a thin smooth surface cooktop of the class described with a reflector pan beneath the heat source and a large metal support plate beneath the expanse of the glass-ceramic plate as a solid support means.

A further object of the present invention is to provide a smooth surface cooktop with improved supporting means so that a thin glass-ceramic plate may be used having a low thermal mass.

SUMMARY OF THE INVENTION

The present invention, in accordance with one form thereof, relates to a smooth surface electric cooktop having a large glass-ceramic plate means with individual heated areas defined by a combined aluminum plate and heating element to provide good thermal coupling between the heating element and the glass-ceramic plate. The aluminum plate is supported over a reflector pan and the top portion of the reflector pan extends outwardly to underlie the expanse of the glass-ceramic plate and serve as a support means therefor. The aluminum plate is reinforced to prevent warpage. An adjustable hold-down means secures each heating unit in a mounting box.

BRIEF DESCRIPTION OF THE DRAWINGS

This invention will be better understood from the following description taken in conjunction with the accompanying drawings and its scope will be pointed out in the appended claims.

DESCRIPTION OF THE PREFERRED EMBODIMENT

Figure 1:
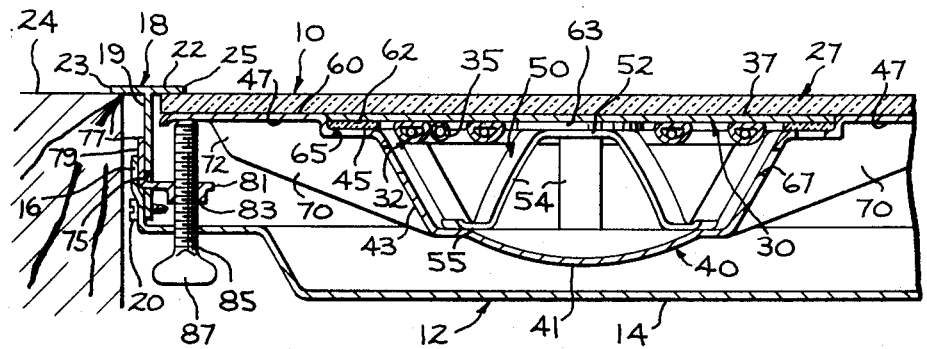
FIG. 1 is a fragmentary cross-sectional elevational view through a smooth surface electric cooktop embodying the present invention showing just one of the heated areas of the cooktop.
Figure 3:
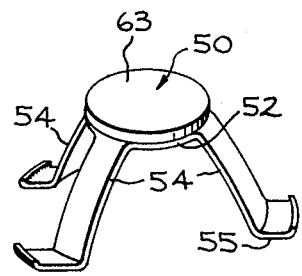
FIG. 3 is a perspective view of a metal compression spring that is provided for each heated portion of the cooktop to bear against the underside of the heated aluminum plate to ensure good thermal coupling between the aluminum plate and the glass-ceramic plate.

Turning now to a consideration of the drawings and in particular to FIG. 1, there is shown a cross-sectional elevational view of one heated portion of a smooth surface electric drop-in cooktop 10. It will be understood by those skilled in this art that this same invention could be incorporated in the cooktop of a free-standing or slide-in range over an oven structure without departing from the scope of the present invention. This cooktop is furnished with a rough-in mounting box 12 of shallow depth having a generally flat bottom wall 14 and vertical side flanges 16. Fastened over the vertical side flanges 16 is a large rectangular trim ring or frame 18 of generally T-shaped in transverse cross-section. The shank 19 of the T is fastened to the side flanges 16 by means of a series of sheet metal screws 20, while the head 22 of the trim ring is of flat configuration forming a first outer flange 23 to serve as a support means that bears upon the peripheral edge 24 of a kitchen counter surface while a second inner flange 25 is adapted to form a seal with the top surface of the cooktop 10. In other words, this rough-in mounting box 12 is provided with an open top surface that is adapted to be closed by a thin glass-ceramic plate means 27 which may either be a single large plate with a plurality of heated areas or groups of two or perhaps four smaller glass plates mounted in a common plane to serve as a smooth surface for the cooktop.

FIG. 1 also shows at the left side one of a plurality of adjustable clamping means 85 cooperating with the trim strip 18 for supporting the glass-ceramic plate 27 within the mounting box 12. The shank 19 of the trim strip 18 is provided with a slotted opening 75 for receiving a generally L-shaped bracket 77 therethrough. The upper arm 79 of the bracket 77 is captured between the shank of the trim strip and the side flange 16 of the mounting box 12 when those two elements 16 and 18 are assembled together. The horizontal base portion 81 of the bracket 77 is provided with a threaded opening 83 for receiving a heavy duty turn screw 85 therein that has a finger-engaging head portion 87 so that this crew may be tightened in an upward direction to engage the underside of the extension 47 of the reflector pan 40 and thereby confine the peripheral edge of the glass-ceramic plate 27 beneath the innermost flange 24 of the trim strip 18. Notice that the head 87 of the turn screw 85 is located beneath the bottom wall of the mounting box 12 so that the adjustment can be made from beneath the entire cooktop assembly.

FIG. 1 shows only one heated area of the glass-ceramic plate 27. The foregoing will be understood by those skilled in this art that the most common type of cooktop is provided with a series of four heated areas or in a more limited sense two heated areas. It is understandable that the present invention might be used as a single, glass-ceramic plate surface heating unit. Each heated area is provided with a thin aluminum plate 30 or similar material of high thermal conductivity. This aluminum plate 30 may either be of sheet material or it may be an aluminum casting. In the case of the sheet metal plate, there would be a metal sheathed electrical resistance heating element 32 of coiled configuration which would be brazed to the underside of the plate. In the event the aluminum plate is a casting, the heating element may be cast directly with the plate. The particular aluminum plate 30 shown is of stamped metal configuration. The metal sheathed heating element 32 is coiled into two loops. As is well understood by those skilled in this electric heating and cooking art, such a metal sheathed heating element 32 would include a central nichrome resistance heating wire of helical formation that is inserted into a thin metal tube or sheath preferably of aluminum. Then the sheath is filled with a suitable electrically insulating and thermally conductive material such as magnesium oxide (MgO) or the like to separate the inner heater wire from the outer metal sheath. The top surface of the heating element 32 is flattened somewhat so as to obtain a good area contact of the metal sheath with the aluminum plate 30.

It is important to limit the operating temperature of the glass-ceramic plate 27 to a temperature below about 900° F. This can best be done by introducing a temperature limiting means to the aluminum plate such that the power to the heating element 32 is cut off when the aluminum plate temperature reaches a predetermined limit. This temperature limiting means comprises a temperature sensor or elongated bulb 35 which is brazed or otherwise attached to the underside of the aluminum plate 30 adjacent a turn or loop of the heating element 32, as is best seen in FIG. 1. This sensor 35 would be filled with a high temperature thermostatic fluid such as sodium potassium (NaK) or the like which would communicate with a temperature responder (not shown) by means of an elongated capillary tube (not shown) as is well known in the thermostat art. Such a temperature responder would be either a single point temperature limiting switch or an automatic surface unit thermostat with a selective temperature range between about 140° and 900° F. and set at a critical temperature of about 900° F. This temperature responder would be electrically connected in the power circuit for the heating element 32. It would be important to electrically ground the aluminum plate 30 because the glass-ceramic plate 27 may become conductive toward the upper end of its temperature range, and this would otherwise create a safety hazard to the user.

A high emissivity coating 37 such as porcelain enamel, silica or the like is applied to the top surface of the aluminum plate 30 so as to speed up the rate of heat transfer from the aluminum plate 30 to the glass-ceramic plate 27 and at the same time prevent any adverse chemical reaction between the two plates. Such a coating would prevent metallic contact between the aluminum plate 30 and the glass-ceramic plate 27, thus reducing the possibility of etching or the creation of weak spots in the glass-ceramic plate 27.

Figure 2:
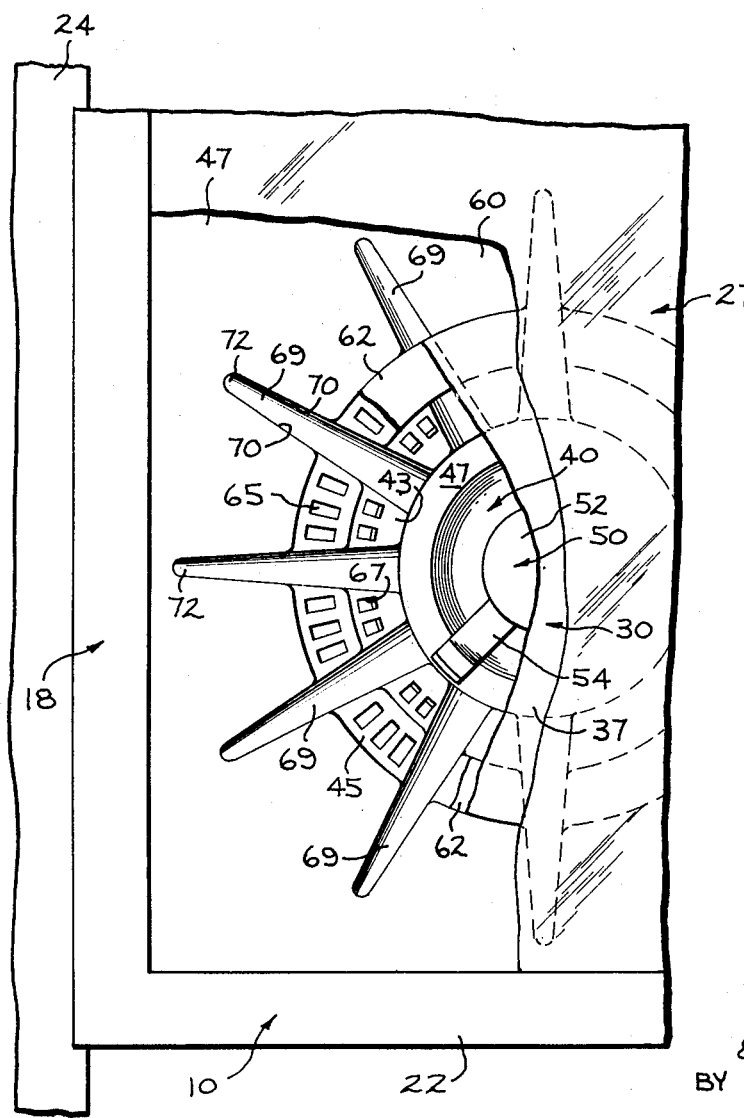
FIG. 2 is a fragmentary plan view of the smooth surface electric cooktop of FIG. 1 with parts broken away to show the various layers of materials which go to make up the cooktop assembly.

Positioned beneath the aluminum plate 30 is a deep drawn sheet metal reflector pan 40 which has a bottom wall 41, an upwardly and outwardly sloping side wall 43, and a top horizontal flange or ledge 45 which underlies the peripheral edge of the aluminum plate 30 and serves as the support means therefor. Notice in FIG. 2 that the surface area of the glass-ceramic plate 27 is a great deal larger than the surface area of the circular aluminum plate 30. In other words, the heated area of the cooktop is small as compared with the entire area of the cooktop. The aluminum plate 30 may have many different shapes, but the most common shapes would be circular, square or slightly rectangular. Generally the size of the heated area would be between 6 inches and 10 inches in diameter. The expanse of the glass-ceramic plate 27 that extends beyond the heated area may be from about 3 to 6 inches and perhaps more in some cases. In some modifications of this invention there would be a single large glass-ceramic plate 27 for the entire cooktop which would be provided with four heated areas. It is desirable to reduce the thermal mass of the glass-ceramic plate 27 to a minimum and this can only be done by using a very thin plate, on the order of 0.125 inch. This alone, of course, would increase the breakage hazard, thus a reinforcing means for the glass cooktop has been provided by extending the horizontal ledge 45 of the reflector pan 40 outwardly in a horizontal plane in all directions to underlie the expanse of the glass-ceramic plate 27 which surrounds the heated area of the glass plate. Thus the glass-ceramic plate is seated on both the aluminum plate 30 as well as the horizontal extension 47 of the reflector pan 40.

It is well to reinforce the outward horizontal extension 47 of the reflector pan 40 and this is done by forming a large number of radial, tapered depressions 69 of rather deep configuration in the extension. The depressions 69 are each formed by side walls 70. The tapered depression is the deepest where it merges with the bottom wall 41 of the reflector pan 40 and is the shallowest at the outermost extremity of the depression, as is best seen in FIG. 1 at 72.

During the testing, it was noticed that the aluminum plate 30 becomes soft and sags at temperatures around 800° F. such that some reinforcing means for it must also be provided. A thick layer of fiber glass material filling the reflector pan 40 would not be satisfactory because such material is too resilient, and it would not prevent the aluminum plate from separating from the glass and resulting in a considerable drop in heating performance. The thickness of the aluminum plate 30 does not contribute in this thermal system to prevent warpage. A thin plate is recommended, preferably on the order of 0.080 inch. There is a rigid support for the peripheral edge of the aluminum plate 30 by means of the horizontal ledges 45 of the reflector pan 40. The center of the aluminum plate 30 is acted upon by the presence of a heavy duty metal compression spring 50 of sheet metal construction, such as beryllium copper, stainless steel or the like. This spring 50 has a planar top surface 52 and three strong resilient legs 54, each having a foot 55 which bears on the bottom wall 41 of the reflector pan. Notice how this spring member 50 has the appearance of a short legged tripod. The presence of such a heavy compression spring 50 ensures close thermal coupling between the heated aluminum plate 30 and the glass-ceramic plate 27 for obtaining a good heating performance of the cooktop.

In order to reduce the stress and strain on the glass-ceramic plate 27, while allowing a strong upward pushing force by the spring 50, the glass-ceramic plate may be bonded by a suitable high temperature adhesive to the top surface of the reflector extension 47, as at 60. Because the heated area of the glass-ceramic plate 27 operates at a maximum temperature of around 750° F., and because this plate is a poor heat conductor, especially in the plane of the plate, there is a sharp temperature drop as the glass extends outwardly beyond the heated area. Hence, a high temperature adhesive such as General Electric Silicone SR–527 or SR–585 may be used to attach the glass plate 27 to the reflector pan extension 47. This adhesive would also serve as a shock absorbing means.

It is also well to minimize the conduction of heat from the aluminum plate 30 to the reflector pan 40 either directly by way of the support ledges 45 or indirectly through the compression spring 50. This may be accomplished by the introduction of a thin layer of thermal insulating material 62, such as asbestos, of annular shape onto the ledge 45 of the reflector pan 40, as well as a similar layer 63 over the planar area 52 of the compression spring 50, thereby spacing the aluminum plate 30 away from the reflector pan and its compression spring. Further heat conduction can be minimized by providing a thermal break in the reflector pan by means of a plurality of closely spaced slots 65 in the ledge 45 of the reflector pan, as well as another series of similar slots 67 in the upper edge of the reflector side walls 43, all as is best seen in the plan view of FIG. 2. Another reason for the existence of this second set of slots 67 is to provide air entrance openings in the reflector pan 40 so that a faster cool-down of the glass-ceramic plate may be affected by the use of a forced air cooling system operating beneath the cooktop. Such a cooling system is not illustrated here as it does not form part of the present invention, but it would consist of a blower means creating a whirlwind action of room ambient air beneath the cooktop such that the air would pass into the reflector pan through the slots 67 and then out of the reflector pan through similar openings thereby carrying away some of the heat of the aluminum plate 30 and increasing the rate of cool-down of the heating unit.

Modifications of this invention will occur to those skilled in this art, therefore, it is to be understood that this invention is not limited to the particular embodiments disclosed, but that it is intended to cover all modifications which are within the true spirit and scope of this invention as claimed.

What is claimed as new and desired to be secured by Letters Patent of the United States is:

1. A surface heating unit comprising a thin plate of glass-ceramic material supported on an aluminum plate, a metal sheathed heating element attached to the underside of the aluminum plate in a spiral form with an open central portion, a dished sheet metal reflector pan on which the aluminum plate is supported, and metallic spring means seated in the reflector pan and compressed against the central portion of the aluminum plate to maintain the aluminum plate flat against the glass-ceramic plate during the heating of the heating element to maintain maximum heat transfer beneath the heated aluminum plate and the glass-ceramic plate.

2. A surface heating unit as recited in claim 1 where the top surface of the aluminum plate is furnished with a high emissivity coating to be in contact with the glass-ceramic plate so as to assist the transfer of heat from the aluminum plate to the glass-ceramic plate as well as to prevent a reaction between the aluminum and the glass-ceramic material.

3. A surface heating unit comprising a plate of glass-ceramic material supported on an aluminum plate, a metal sheathed heating element arranged in a spiral configuration with an open central portion, said heating element being attached to the underside of the aluminum plate, a dished sheet metal reflector pan seated beneath the aluminum plate, and metallic spring means seated in the reflector pan and compressed against the underside of the aluminum plate to maintain the aluminum plate uniformly against the glass-ceramic plate during the heating of the heating element to maintain maximum heat transfer between the heated aluminum plate and the glass-ceramic aluminum plate, said metallic spring means being a strong sheet metal member with a planar top surface adapted to bear against the underside of the aluminum plate in the open central portion defined by the spiral heating element, said spring having a plurality of inclined support legs extending from beneath the top surface.

4. A surface heating unit as recited in claim 3 wherein the said reflector pan has a flattened support ledge underlying the peripheral edge of the aluminum plate, there being a thin layer of thermal insulating material compressed between the aluminum plate and the said ledge and between the aluminum plate and the top planar surface of the compression spring so as to restrict the conduction of heat to the reflector pan.

5. A smooth surface cooktop comprising a thin top plate of glass-ceramic material of relatively large area, a concentrated heated area of the glass-ceramic plate defined by an aluminum plate in contact with the underside of the glass-ceramic plate, a metal sheathed heating element fixed to the underside of the aluminum plate, a large metal plate underlying the glass-ceramic plate, the area of the metal plate surrounding the aluminum plate being in supporting engagement with the glass-ceramic plate, a narrow area of the metal plate underlying the peripheral edge of the aluminum plate and being in supporting engagement with said aluminum plate, the area of the metal plate underlying the central area of the aluminum plate being drawn into a reflector pan, and a metallic spring seated in the reflector pan and compressed against the underside of the aluminum plate to ensure good thermal coupling between the heated aluminum plate and the glass-ceramic plate.

6. A smooth surface cooktop as recited in claim 5 wherein the outer portion of the said large metal plate surrounding the reflector pan portion is provided with a plurality of spaced reinforcing rib means to ensure a rigid support means for the glass-ceramic plate.

7. A smooth surface cooktop as recited in claim 6 wherein a thin layer of thermal insulating material is sandwiched between the aluminum plate and both the narrow area of the underlying metal plate and the metallic spring.

8. A smooth surface cooktop as recited in claim 7 with a high temperature adhesive bonding the glass-ceramic plate to the said metal plate in the area surrounding the aluminum plate.

9. A smooth surface heating unit comprising a flat plate of glass-ceramic material supported on an aluminum plate having a metal sheathed heating element attached thereto for furnishing heat to the glass-ceramic plate, the top surface of the aluminum plate having a high emissivity coating to improve the transfer of heat to the glass-ceramic plate, a deep drawn reflector pan underlying the aluminum plate, the reflector pan having a narrow shelf on which the aluminum plate is seated, a metal spring seated in the reflector pan and bearing against the underside of the aluminum plate to ensure good thermal coupling between the aluminum plate and the glass-ceramic plate at all times, the said glass-ceramic plate being of enlarged size to extend beyond the boundaries of the aluminum plate, the reflector pan also being of enlarged size with a generally planar area supporting the extended area of the glass-ceramic plate, an open-topped mounting box in which the surface heating unit is supported, and adhesive means joining the glass-ceramic plate to the reflector pan, and adjustable clamping means for sealing the peripheral edge of the heating unit to the mounting box.

10. A smooth surface electric cooktop comprising a large open-topped mounting box supporting a plurality of glass-ceramic plate heating units, where each heating unit includes a large flat plate of glass-ceramic material supported on a smaller thin metal heating plate of high heat conductivity having a metal sheathed heating element attached thereto for furnishing heat to the glass-ceramic plate, a large metal support plate underlying the large glass-ceramic plate, said metal support plate engaging the glass-ceramic plate in the area surrounding the heating plate, as well as engaging the peripheral edge of the heating plate, the main portion of the metal support plate beneath the heating plate being formed into a dished reflector pan, and reinforcing means cooperating with the heating plate to prevent warpage of the heating plate when it is subjected to high thermal stresses.

11. A smooth surface electric cooktop as recited in claim 10 with the addition of a high temperature adhesive bonding the metal support plate to the glass-ceramic plate in the area surrounding the heating plate, said adhesive also serving as a shock absorbing means.

* * * * *